No. 714,271. Patented Nov. 25, 1902.
J. M. ALDERFER.
VEHICLE WHEEL.
(Application filed May 9, 1902.)
(No Model.)

Witnesses
Jas. G. Koehl.
D. Willson

Inventor
John M. Alderfer
By H. R. Willson & Co.
Attorneys

UNITED STATES PATENT OFFICE.

JOHN M. ALDERFER, OF SHARON CENTER, OHIO.

VEHICLE-WHEEL.

SPECIFICATION forming part of Letters Patent No. 714,271, dated November 25, 1902.

Application filed May 9, 1902. Serial No. 106,528. (No model.)

*To all whom it may concern:*

Be it known that I, JOHN M. ALDERFER, a citizen of the United States, residing at Sharon Center, in the county of Medina and State of Ohio, have invented certain new and useful Improvements in Vehicle-Wheels; and I do declare the following to be a full, clear, and exact description of the invention, such as will enable others skilled in the art to which it appertains to make and use the same.

The invention relates to vehicle-wheels.

The object of the invention is to provide novel means for connecting a cushion-tire to the metal rim of a vehicle-wheel, whereby the said tire will be securely retained in place, special provision being made to prevent the tire from snapping or pulling sidewise from engagement with the metal rim.

With the above and other objects in view, which will readily appear as the nature of the invention is better understood, said invention consists in certain novel features of construction and combination and arrangement of parts, which will be hereinafter fully described, defined in the appended claims, and illustrated in the accompanying drawings, in which—

Figure 1:
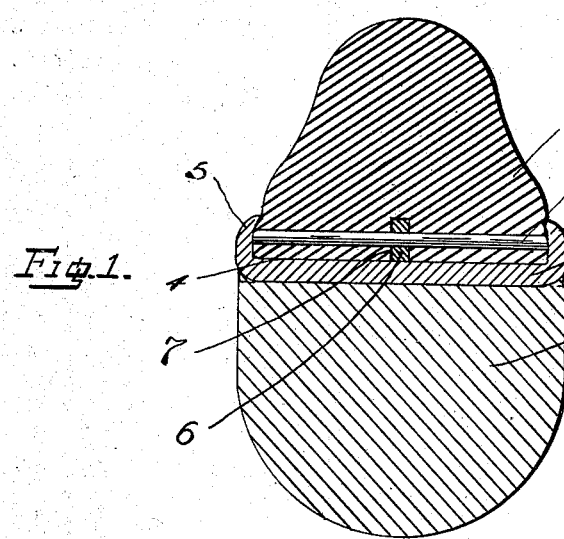
Figure 2:
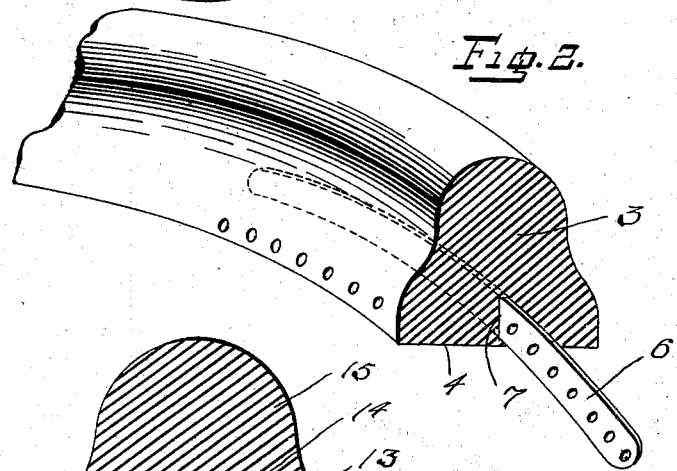
Figure 3:
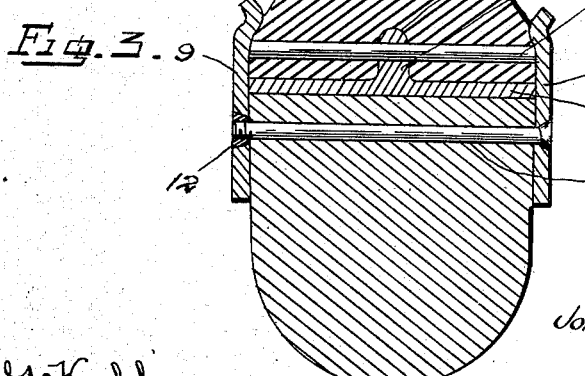

Figure 1 is a cross-sectional view through the wooden rim of a vehicle-wheel, illustrating the application of my invention. Fig. 2 is an end view of the cushion-tire of that type in which the tire is molded in a strip and is designed to be applied to the wheel and have its ends connected by a coupling. Fig. 3 is a cross-sectional view of a modified form of the invention.

Referring to Fig. 1, 1 denotes the wooden frame of a vehicle-wheel.

2 denotes a channel-iron rim connected to the wooden rim in any desired manner.

3 denotes the cushion-tire, having a base 4 to conform to the flat surface of the base of the channel-iron, the breadth of said base 4 being less than the distance between the side pieces 5 of said rim before the rim is clamped in position, as will be hereinafter more fully described.

The cushion-tire may be molded in annular form or may be molded straight and bent around the rim and have its ends connected together in any suitable manner. When thus made, I find it convenient to connect the ends by means of a coupling-strip 6, the ends of which fit in grooves 7, formed in the ends of the tire.

8 denotes metal pins extending transversely to the tire near its base and at a point to be engaged by the flanges or side pieces 5 of the rim. These pins are arranged equidistant apart—for instance, one and a quarter inches—and may be inserted in the tire after it has been molded or may be molded directly in the tire. After the tire has been placed in the channel-iron rim the side pieces or flanges 5 of said rim are bent toward each other, so that the distance between the edges of said flanges is less than the length of the pins, thus preventing the withdrawal or removal of the tire from the rim. The pins at the ends of the tire when the tire is molded in the form of a strip are adapted to project through the holes in the coupling-strip, and thus securely retain said coupling in position.

In the construction shown in Fig. 3 I have illustrated the channel-iron rim as being composed of three parts—the two side pieces 9 and the base 10. The side pieces 9 are connected to the wooden rim by bolts 11, the heads of which are countersunk in one side piece, while their outer ends receive tapering nuts 12, which are countersunk in the opposite side piece. The base 10 fits the periphery of the wooden rim and has its edges abutting against the inner faces of the side pieces and is formed with a central longitudinal rib 13, which projects into the correspondingly-shaped groove 14, formed in the base of the cushion-tire 15. The side pieces 9 have their outer ends bent slightly inwardly, so that the distance between the inwardly-bent ends is less than the length of the pins 16, which pass transversely through the tire and through the holes formed in the rib 13, thus, as in the other form of the invention, preventing the accidental displacement of the cushion-tire with respect to the metal rim. By the employment of this form of metal rim I am enabled to securely connect the parts together without bending the metal, as is necessary in the form shown in Fig. 1 of the drawings, in which it will be noticed that the side pieces or flanges of the channel-iron rim are bent toward each other after the cushion-tire has been seated in the channel-iron rim. In the construction shown in Fig. 3 after the tire has been seated upon the base of the channel-iron rim the nuts 12 are tightened, thus drawing the flanges 9 closely together and causing the outer inwardly-bent edges of the same to inclose the ends of the pins and prevent displacement of the tire.

From the foregoing description, taken in connection with the accompanying drawings, it is thought that the construction, mode of operation, and advantages of my improved vehicle-wheel will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a vehicle-wheel, the combination with a channel-iron rim, of a cushion-tire, and pins extending transversely through the tire, the length of the pins being greater than the distance between the free edges of the side pieces of the channel-iron rim, the base of said channel-iron rim being provided with an annular rib through which said pins project and thus prevent the creeping of the tire with respect to the channel-iron rim, substantially as set forth.

2. In a vehicle-wheel, the combination with a channel-iron rim; of a cushion-tire, and pins extending transversely through the tire, the length of the pins being greater than the distance between the free edges of the side pieces of the channel-iron rim, said side pieces being adjustable toward and away from each other, the base of said channel-iron rim being provided with an annular rib through which said pins project and thus prevent the creeping of the tire with respect to the channel-iron rim, substantially as set forth.

In testimony whereof I have hereunto set my hand in presence of two subscribing witnesses.

JOHN M. ALDERFER.

Witnesses:
J. C. VAN ORMAN,
A. C. VAN ORMAN.